United States Patent Office 3,847,921
Patented Nov. 12, 1974

3,847,921
PHARMACOLOGICALLY ACTIVE 3-PIPERAZINYL-
CARBONYLOXY - 2 - PYRIDYL-ISOINDOLIN-1-
ONES
Claude Cotrel, Choisy le Roi, Claude Jenmart, Brunoy, and Mayer Naoum Messer, Bievres, France, assignors to Rhone-Poulenc S.A., Paris, France
No Drawing. Filed Aug. 18, 1971, Ser. No. 172,929
Claims priority, application France, Aug. 19, 1970, 7030393; Nov. 25, 1970, 7042342; June 28, 1971, 7123465
Int. Cl. C07d 51/70
U.S. Cl. 260—268 BC       6 Claims

ABSTRACT OF THE DISCLOSURE

Isoindolin-1-one derivatives substituted in the 2-position by an unsubstituted or substituted pyridyl or pyridyl-N-oxide group, substituted in the 3-position by a piperazin-1-ylcarbonyloxy or piperazin-1-ylthiocarbonyloxy group, and optionally substituted in the 4- to 7-positions by one or more halogen atoms, or alkyl, alkoxy, cyano or nitro radicals, possess pharmacological properties and are particularly active as tranquilisers and anti-convulsant agents.

---

This invention relates to new therapeutically useful isoindoline derivatives, to processes for their preparation and pharmaceutical compositions containing them.

The new isoindoline derivatives of the present invention are those of the general formula:

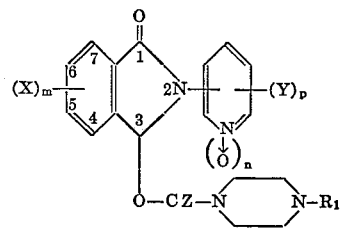

wherein X represents a halogen (preferably chlorine or bromine) atom, or an alkyl or alkoxy radical containing 1 to 4 carbon atoms, or a nitro radical, $m$ represents zero or an integer from 1 to 4 (preferably zero, 1 or 2), Y represents a halogen (preferably chlorine or bromine) atom, or an alkyl or alkoxy radical containing 1 to 4 carbon atoms, or a cyano or nitro radical, $p$ represents zero or an integer from 1 to 4 (preferably zero, 1 or 2), $R_1$ represents an alkyl (preferably methyl) or hydroxyalkyl (e.g. hydroxyethyl) radical containing 1 to 4 carbon atoms, or an alkenyl radical containing 2 to 4 carbon atoms (e.g. allyl), Z represents an oxygen or sulphur atom (preferably oxygen), and $n$ represents zero or 1 (preferably zero), and acid addition salts thereof. When symbols $m$ and $p$ represent the integers 2, 3 or 4 it is to be understood that the atoms or radicals present on the isoindoline and pyridyl nuclei may be the same or different.

According to a feature of the invention, the isoindoline derivatives of general formula I wherein Z represents an oxygen atom are prepared by the process which comprises reacting a piperazine compound of the general formula:

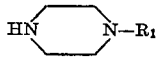

(wherein $R_1$ is as hereinbefore defined) with a mixed carbonate of the general formula:

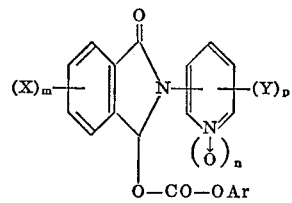

wherein X, $m$, Y, $p$ and $n$ are as hereinbefore defined, and Ar represents a phenyl radical optionally substituted by an alkyl radical containing 1 to 4 carbon atoms. The reaction is generally carried out in an inert organic solvent, for example acetonitrile, at a temperature of 15° to 25° C.

The mixed carbonates of general formula III can be prepared by reaction of a chloroformate of the general formula:

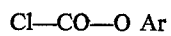

(wherein Ar is as hereinbefore defined) with an isoindoline derivative of the general formula:

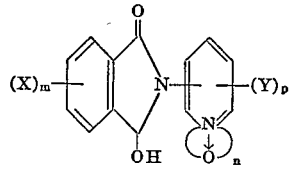

wherein the various symbols are as hereinbefore defined. The reaction is generally carried out in a basic organic solvent, for example pyridine, and at a temperature below 10° C.

The isoindoline derivatives of general formula V can be obtained by partial reduction of a phthalimide derivative of the general formula:

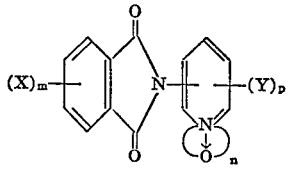

wherein the various symbols are as hereinbefore defined. The reaction is generally carried out by means of an alkali metal borohydride in an alcoholic or aqueous-alcoholic medium.

When the phthalimido radical is unsymmetrically substituted, the partial reduction of a compound of general formula VI can lead to isomeric products which can be separated by physico-chemical methods such as fractional crystallisation or chromatography.

The phthalimide derivatives of general formula VI can be obtained by reaction of an aminopyridine of the general formula:

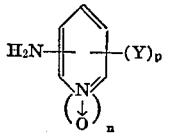

(wherein Y, $p$ and $n$ are as hereinbefore defined) with a phthalic anhydride of the general formula:

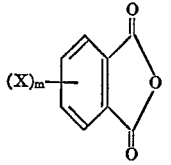

wherein X and $m$ are as hereinbefore defined.

According to another feature of the invention, the isoindoline derivatives of general formula I wherein Z represents an oxygen or sulphur atom are prepared by the process which comprises reacting a piperazine derivative of the general formula:

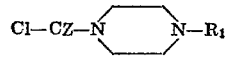

IX (wherein Z and $R_1$ are as hereinbefore defined) with an alkali metal salt, optionally prepared in situ, of an isoindoline derivative of general formula V. In general, the reaction is carried out in an anhydrous organic solvent, for example dimethylformamide, at a temperature below 50° C., preferably at 20°–35° C.

The isoindoline derivatives of general formula I obtained by the aforementioned processes can be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The isoindoline derivatives of general formula I may be converted by methods known per se into acid addition salts. The acid addition salts may be obtained by the action of acids on the isoindoline derivatives in appropriate solvents. As organic solvents there may be used alcohols, ethers, ketones or chlorinated hydrocarbons. The salt which is formed is precipitated, if necessary after concentration of the solution, and is isolated by filtration or decantation.

The isoindoline derivatives of the invention and their acid addition salts possess valuable pharmacological properties; they are particularly active as tranquilisers and anti-convulsant agents. In animals (mice) they have proved active as such at doses of between 5 and 100 mg./kg. animal body weight when administered orally, in particular in the following tests:

(i) electric battle test according to a technique similar to that of Tedeschi et al. [J. Pharmacol., 125, 28 (1959)],
(ii) convulsion with pentetrazole according to a technique similar to that of Everett and Richards [J. Pharmalcol., 81, 402 (1944)],
(iii) supramaximal electroshock according to the technique of Swinyard et al. [J. Pharmacol., 106, 319 (1952)], and
(iv) locomotor activity according to the technique of Courvoisier [Congrès des Medécins, Aliénistes et Neurologistes—Tours—(8/13th June 1959)].

Preferred isoindoline derivatives of the invention are those of general formula I in which the pyridyl group is linked at the 2-position to the isoindoline group and especially those compounds wherein $R_1$ represents an alkyl radical containing 1 to 4 carbon atoms (preferably methyl) and, more particularly, those compounds wherein Z represents an oxygen atom and n represents zero. Of outstanding importance is the class of compounds in which X and Y represent halogen atoms, alkyl radicals containing 1 to 4 carbon atoms or nitro radicals m and p represent zero, 1 or 2, $R_1$ represents an alkyl radical containing 1 to 4 carbon atoms, Z represents an oxygen atom, and n represents zero, and especially the compounds 2-(5-chloropyrid-2-yl)-3-(4-methylpiperazin-1-yl)
 carbonyloxy-isoindolin-1-one,
3-(4-methylpiperazin-1-yl)carbonyloxy-2-(5-methyl-
 pyrid-2-yl)-isoindolin-1-one, 2-(5-bromopyrid-2-yl)-3-(4-methylpiperazin-1-yl)
 carbonyloxy-isoindolin-1-one,
5-chloro-2-(5-chloropyrid-2-yl)-3-(4-methylpiperazin-
 1-yl)carbonyloxy-isoindolin-1-one and
2-(5-chloropyrid-2-yl)-3-(4-methylpiperazin-1-yl)
 carbonyloxy-5-nitro-isoindolin-1-one, and their acid addition salts.

For therapeutic purposes, the isoindoline derivatives of general formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllinacetates, salicylates, phenolphthalinates and methylene-bis-$\beta$-hydroxynaphthoates) so that the beneficial physiological properties inherent in the bases are not vitiated by side-effects ascribable to the anions.

The following Examples illustrate the invention.

EXAMPLE 1

A mixture of 3-phenoxycarbonyloxy-2-(pyrid-2-yl)-isoindolin-1-one (3.5 g.) and 4-methylpiperazine (2 g.) in acetonitrile (20 cc.) is stirred for 48 hours at a temperature of about 20° C. Thereafter the crystalline white insoluble material is filtered off and, after drying, a product (2.5 g.) melting at 170° C. is obtained. Recrystallisation from acetonitrile (30 cc.) yields 3-(4-methylpiperazin-1-yl)carbonyloxy-2-(pyrid-2-yl)-isoindolin-1-one (2.1 g.) melting at 171° C.

3-Phenoxycarbonyloxy-2-(pyrid-2-yl)-isoindolin-1-one employed as starting material can be prepared by adding over the course of 80 minutes phenyl chloroformate (145.3 g.) to a solution of 3-hydroxy-2-(pyrid-2-yl)-isoindolin-1-one (200 g.) in anhydrous pyridine (1000 cc.) whilst stirring and maintaining the temperature at between 5° and 8° C. The reaction mixture is then left for 4 hours at a temperature of about 20° C. and afterwards is poured into water (3000 cc.). A product crystallises and is filtered off; it is washed with water (3 × 400 cc.) and dried. White crystals (297 g.) melting at 155° C. are thus obtained. Recrystallisation from acetonitrile (1000 cc.) yields 3-phenoxycarbonyloxy-2-(pyrid-2-yl)-isoindolin-1-one (173.9 g.) melting at 164° C.

3-Hydroxy-2-(pyrid-2-yl)-isoindolin-1-one can be prepared by slowly adding a solution of potassium borohydride (2 g.) in water (18 cc.) and N sodium hydroxide (2 cc.) to a suspension of 2-phthalimido-pyridine (11.2 g.) in methanol (50 cc.), whilst stirring and maintaining the temperature between 20° and 30° C. After 20 hours at a temperature of about 20° C., the insoluble matter is filtered off and dried to give 3-hydroxy-2-(pyrid-2-yl)-isoindolin-1-one (8.3 g.) melting at 140° C.

2-Phthalimido-pyridine can be prepared according to the method described by E. Koenigs and H. Greiner, Chem. Ber., 64, 1055 (1931).

EXAMPLE 2

A solution of 3-hydroxy-2-(pyrid-2-yl)-isoindolin-1-one (12.9 g.) in anhydrous dimethylformamide (100 cc.) is rapidly added to a suspension of sodium hydride (54% dispersion in mineral oil) (2.8 g.) in anhydrous dimethylformamide (30 cc.), whilst keeping the temperature at about 27° C. When the evolution of gas has ceased, 1-chlorocarbonyl-4-methylpiperazine (9.3 g.) is slowly added whilst keeping the temperature at between 25° and 35° C. The reaction mixture is stirred for a further 20 minutes after the end of the addition and is then poured into ice-water (1000 cc.). The crystalline product which forms is filtered off and then washed with water (150 cc.) After drying, a product (18.7 g.) melting at 169–170° C. is obtained. Recrystallisation from acetonitrile (160 cc.)

yields 3 - (4-methylpiperazin-1-yl)-carbonyloxy-2-(pyrid-2-yl)-isoindolin-1-one (16.4 g.) melting at 172° C.

1-Chlorocarbonyl-4-methylpiperazine employed as starting material can be prepared in accordance with the method described by H. Morren et al., Bull. Soc. Chim. Belges, *59*, 228 (1950).

EXAMPLE 3

4-Methylpiperazine (10 g.) in acetonitrile (25 cc.) is added to a suspension of 5-chloro-3-phenoxycarbonyloxy-2-(pyrid-2-yl)-isoindolin-1-one (19 g.) in acetonitrile (100 cc.). The suspension is left for 24 hours at a temperature of about 20° C., and the insoluble matter is then filtered off. A solid (12.8 g.) melting at about 162–164° C. is thus obtained. This product is dissolved in acetone (650 cc.). A slight amount of insoluble matter is filtered off, and a molar solution (34.5 cc.) of picric acid in acetone is then added to the filtrate. A yellow product crystallises slowly. It is filtered off, and crystals (21.8 g.) melting at about 240° C. are obtained.

This compound is stirred in a mixture of water (300 cc.), methylene chloride (400 cc.) and N lithium hydroxide solution (40 cc.). The organic layer is separated, and the aqueous phase is extracted with methylene chloride (2×100 cc.). The combined organic fractions are washed with water (250 cc.) and dried over potassium carbonate (40 g.) and alumina (20 g.). After filtration, the volatile products are evaporated under reduced pressure and a product (12.7 g.) is thus obtained which, when recrystallised from ethanol (150 cc.), yields 5 - chloro-3-(4-methylpiperazin - 1 - yl)carbonyloxy-2-(pyrid-2-yl)-isoindolin-1-one melting at 165–166° C.

5 - Chloro-3-phenoxycarbonyloxy-2-(pyrid-2-yl)-isoindolin-1-one employed as starting material can be prepared by adding phenyl chloroformate (35.2 g.) to 5-chloro-3-hydroxy-2-(pyrid-2-yl)-isoindolin-1-one (39 g.), dissolved in anhydrous pyridine (750 cc.), at about 20° C. After 15 hours standing at a temperature of about 20° C., the reaction mixture is poured into distilled water (4 litres). A product crystallises and is filtered off; after drying 5-chloro-3-phenoxycarbonyloxy-2-(pyrid-2-yl)-isoindolin-1-one (56.8 g.), melting at 160° C., is obtained.

5 - Chloro-3-hydroxy-2-pyrid-2-yl)-isoindolin-1-one can be prepared by adding over the course of 30 minutes a solution of sodium borohydride (17.75 g.) in methanol (200 cc.) to a suspension of 2 - (4-chlorophthalimido)-pyridine (161 g.) in methanol (870 cc.) at a temperature of between 25° and 35° C. Dissolution first occurs and then, about half-way through the addition, a solid precipitates. The mixture is stirred for a further 2 hours at a temperature of about 20° C. The precipitate which forms is filtered off. After drying, a product (143 g.) melting at about 180° C. is obtained. This product is dissolved in dimethylformamide (800 cc.) under reflux. After cooling, an insoluble material (40.1 g.) is separated off, the filtrate is then evaporated under reduced pressure, and the residue is dissolved in acetone (7000 cc.). Further insoluble matter (11.7 g.) is filtered off, and picric acid (63.6 g.) dissolved in acetone (200 cc.) is then added to the acetone solution. A yellow product crystallises and is filtered off. After drying, a picrate (93.9 g.) melting at 210° C. is obtained.

This picrate is suspended in distilled water (940 cc.). A solution of 57% lithium hydroxide (8.1 g.) in water (200 cc.) is then added. The mixture is stirred for 2 hours. After filtering, moist crystals (104 g.) melting at 190° C. are obtained. Recrystallisation from butanol (900 cc.) yields 5-chloro-3-hydroxy-2-(pyrid-2-yl)-isoindolin-1-one (43.8 g.) melting at 193° C.

2-(4-Chlorophthalimido)-pyridine can be prepared by heating a mixture of 4-chlorophthalic anhydride (128. g.) and 2-aminopyridine (65.8 g.) in diphenyl ether (350 cc.) at 200° C. for 10 minutes. Thereafter the reaction mixture is allowed to return to a temperature of between 35° and 40° C., and diethyl ether (350 cc.) is added. The crystalline product is filtered off and then dried to give 2-(4-chlorophthalimido)-pyridine (161 g.) melting at 155° C.

4-Chlorophthalic anhydride can be prepared according to the method described by Ayling, J. Chem. Soc., 255 (1929).

EXAMPLE 4

4-Methylpiperazine (10.2 g.) is added to a suspension of 6 - nitro - 3-phenoxycarbonyloxy-2-(pyrid-2-yl)-isoindolin-1-one (20 g.) in acetonitrile (110 cc.). After 18 hours standing, the crystals which form are filtered off. A product (18.8 g.) melting at 205° C. is thus obtained.

The product is dissolved in benzene (2200 cc.). After filtering off a slight amount of insoluble matter, the solution is filtered over silica gel (470 g.) contained in a column 5.8 cm. in diameter. The column is thereafter eluted with a benzene acetate mixture (1–1 by volume; 1000 cc.), a benzene-ethyl acetate mixture of (1–3 by volume; 3500 cc.), ethyl acetate (500 cc.) and then an ethyl acetate-methanol mixture (95–5 by volume; 1000 cc.). All these eluates are discarded. Thereafter the volume is eluted with an ethyl acetate-methanol mixture (95–5 by volume; 6000 cc.). The solution obtained is concentrated to dryness under reduced pressure. A product (16.4 g.) melting at 218° C. (with a transformation at 210° C.) is thus obtained. Recrystallisation from acetonitrile (600 cc.) yields 3 - (4 - methylpiperazin-1-yl)carbonyloxy-6-nitro - 2-(pyrid-2-yl)isoindolin-1-one (14.8 g.) melting at 218 C.) with a transformation at 210° C.). The structure of this product was confirmed by the nuclear magnetic resonance spectrum.

6-Nitro - 3 - phenoxycarbonyloxy-2-(pyrid-2-yl)-isoindolin-1-one employed as starting material can be obtained by adding phenyl chloroformate (23 g.) to a suspension of 3-hydroxy-6-nitro-2-pyrid-2-yl)-isoindolin-1-one (26.9 g.) in anhydrous pyridine (550 cc.), whilst maintaining the temperature at about 6° C. The reaction mixture is left for 18 hours at a temperature of about 20° C. and then poured into water (2700 cc.). A product crystallises and is filtered off. After drying, 6-nitro-3-phenoxycarbonyloxy-2-(pyrid-2-yl)-isoindolin - 1 - one (37.4 g.), melting at 210° C., is obtained.

3-Hydroxy - 6 - nitro-2-(pyrid-2-yl)-insoindolin-1-one can be prepared as indicated in Example 5.

EXAMPLE 5

4-Methylpiperazine (7.4 g.) is added to a suspension of 5-nitro - 3 - phenoxycarbonyloxy-2-(pyrid-2-yl)-isoindolin-1-one (13.4 g.) in acetonitrile (67 cc.). The temperature remains at about 25° C.; the mixture is then left for 18 hours at a temperature of about 20° C. The crystals are then filtered off and, after drying, a product (12.2 g.) melting at about 238–245° C. is obtained. These crystals are dissolved in benzene (1500 cc.) and the solution obtained is filtered over silica gel (300 g.) contained in a column 4.4 cm. in diameter. The column is eluted with a benzene-ethyl acetate mixture (1–1 by volume; 500 cc.), pure ethyl ethyl acetate (500 cc.) and an ethyl acetate-methanol mixture (95–5 by volume; 500 cc.). All these eluates are discarded. The column is thereafter eluted with an ethyl acetate-methanol mixture (9–1 by volume; 800 cc.). After evaporation of the solvents under reduced pressure, a crystalline product (10.6 g.) is obtained. After two recrystallizations from dimethylformamide, 3-(4-methylpiperazin - 1 - yl)carbonyloxy-5-nitro-2-(pyrid-2-yl)-isoindolin-1-one (7.2 g.), melting at 258° C., is obtained.

The structure of this product was confirmed by the nuclear magnetic resonance spectrum.

5-Nitro-3-phenoxycarbonyloxy - 2 - (pyrid-2-yl)-isoindolin-1-one employed as starting material can be prepared by reacting phenyl chloroformate (11.5 g.) with a suspension of 3-hydroxy-5-nitro-2-(pyrid-2-yl)-isoindolin-1-one (13.2 g.) in anhydrous pyridine (270 cc.) whilst maintaining the temperature at about 5° C. Thereafter the reaction mixture is left for 18 hours at a temperature of about 20° C. and is then poured into water (1380 cc.). The crystals are filtered off and washed with water (3 × 100 cc.). After drying, a product (19.1 g.) melting at 175–179° C. is obtained. Recrystallization from acetonitrile (160 cc.) yields 5 - nitro-3-phenoxycarbonyloxy-2-(pyrid-2-yl)-isoindolin-1-one (13.4 g.) melting at 188° C.

3 - Hydroxy-6-nitro-2-(pyrid-2-yl)-isoindolin-1-one and 3 - hydroxy-5-nitro-2-(pyrid-2-yl)-isoindolin-1-one can be prepared as follows:

Sodium borohydride (6.8 g.) dissolved in methanol (105 cc.) is added to a suspension of 2-(4-nitrophthalimido)-pyridine (64 g.) in methanol (320 cc.) whilst keeping the temperature at about 20° C. The reaction mixture is left for 2 hours at this temperature and the insoluble matter is then filtered off. Crystals (58.5 g.) melting at about 234–236° C. are obtained. They are dissolved in boiling dimethylformamide (295 cc.). The hot solution is treated with decolourising charcoal, filtered and then cooled. The crystals are isolated, and 3-hydroxy-6-nitro-2-(pyrid-2-yl)-isoindolin-1-one (29.5 g.), melting at 268° C., is thus obtained.

The mother liquors are thereafter evaporated under reduced pressure. An orange-yellow residue (29.6 g.) is obtained, which is dissolved in acetone (5000 cc.). A slight amount of insoluble matter persists and is filtered off, and a solution of picric acid (24.5 g.) in acetone (50 cc.) is then added to the filtrate. A yellow product crystallises slowly. After being left at 4° C. for 12 hours, the crystals are filtered off and a product (22.2 g.) melting at 226–227° C. is obtained. Concentration of the acetone solution to ⅕ of its volume yields further product (7.1 g.) melting at 215–216° C.

The two preceding products are combined and then suspended in water (550 cc.). A solution of 57% lithium hydroxide (2.9 g.) in water (80 cc.) is added, whilst stirring. The mixture is vigorously stirred for 4 hours and then filtered. After drying, 3-hydroxy-5-nitro-2-(pyrid-2-yl)-isoindolin-1-one (16.1 g.), melting at 224–225° C., is obtained.

2-(4-Nitrophthalimido)-pyridine can be prepared by heating a mixture of 4-nitrophthalic anhydride (45.5 g.) and 2-aminopyridine (22.2 g.) in diphenyl ether (135 cc.) under nitrogen at 190° C. for 25 minutes. The mixture is allowed to cool and ethanol (225 cc.) is then added. The crystalline product is filtered off. 2-(4-Nitrophthalimido)-pyridine (60.9 g.), melting at 183° C., is thus obtained.

4-Nitrophthalic anhydride can be obtained according to the method described by P. J. Culhane and G. E. Woodward, Organic Synthesis, Vol. I, p. 408 (1944).

EXAMPLE 6

A suspension of 2-(5-chloropyrid-2-yl)-3-hydroxy-isoindolin1-one (10.4 g.) in anhydrous dimethylformamide (80 cc.) is added to a suspension of sodium hydride (50% dispersion in mineral oil) (2.22 g.) in anhydrous dimethylformamide (80 cc.), whilst keeping the temperature at about 27° C. When the evolution of gas ceases, a solution of 1-chlorocarbonyl-4-methylpiperazine (7.15 g.) in anhydrous dimethylformamide (15 cc.) is added whilst keeping the temperature at about 30° C. The reaction mixture is stirred for a further hour after the end of the addition and is then poured into ice-water (800 cc.). The gummy product which precipitates progressively solidifies. It is filtered off and then washed with water (200 cc.). After drying under reduced pressure (30 mm. Hg), a product (15.2 g.) melting at 165–167° C. is obtained.

After recrystallisation from acetonitrile (170 cc.), the product (13.9 g.) melts at 170° C. This product is dissolved in chloroform (100 cc.) and the solution is filtered over silica gel (175 g.) contained in a column 4.5 cm. in diameter. The column is thereafter eluted with chloroform (1500 cc.); the eluate is discarded. Thereafter the column is eluted with ethyl acetate (1000 cc.) and then with methanol (1000 cc.). The solutions obtained are combined and then concentrated to dryness under reduced pressure (30 mm. Hg). Recrystallisation of the product thus obtained from acetonitrile (180 cc.) yields 2-(5-chloropyrid-2-yl)-3-(4-methylpiperazine - 1 - yl)carbonyloxy-isoindolin-1-one (11 g.) melting at 171° C.

2-(5-Chloropyrid-2-yl)-3-hydroxy-isoindolin-1-one employed as starting material can be prepared by slowly adding a solution of potassium borohydride (2.65 g.) in water (26.5 cc.) of N sodium hydroxide (3.3 cc.) to a suspension of 5-chloro-2-phthalimidopyridine (17.1 g.) in methanol (330 cc.), whilst stirring and maintaining the temperature at about 6° C. After 15 hours at a temperature of about 20° C., the insoluble product is filtered off and then washed with methanol (40 cc.). After drying, (5-chloropyrid-2-yl) - 3 - hydroxy-isoindolin-1-one (15.3 g.), melting at 185–186° C., is obtained.

5-Chloro-2-phthalimido-pyridine can be prepared by heating a mixture of phthalic anhydride (14.8 g.) and 2-amino-5-chloropyridine (12.85 g.) in acetic acid (150 cc.) under reflux for one hour. After cooling, the reaction mixture is poured onto ice (500 g.). The product which crystallises is filtered off and then washed with water (200 cc.). After drying 5-chloro-2-phthalimido-pyridine (20 g.) melting at 150° C. is obtained.

2-Amino-5-chloropyridine can be obtained in accordance with the method described by F. Friedrich et al., Pharmazie, 19 (10), 677 (1964).

EXAMPLE 7

A solution of 2-(6-chloropyrid-2-yl)-3-hydroxyisoindolin-1-one (6.5 g.) in anhydrous dimethylformamide (50 cc.) is added to a suspension of sodium hydride (50% dispersion in mineral oil) (1.35 g.) in anhydrous dimethylformamide (50 cc.), whilst keeping the temperature at about 27° C. When the evolution of gas has ceased, a solution of 1-chlorocarbonyl-4-methylpiperazine (4.55 g.) in anhydrous dimethylformamide (10 cc.) is added whilst keeping the temperature at about 30° C. The reaction mixture is stirred for a further hour after the end of the addition and then poured into ice-water (540 cc.). The product which crystallises is filtered off and then washed with water (100 cc.). After drying, a product (9.1 g.) melting at 174–175° C. is obtained. Recrystallisation from ethanol (175 cc.) yields 2-(6-chloropyrid-2-yl)-3-(4-methylpiperazine - 1 - yl)carbonyloxy-isoindolin-1-one (7 g.) melting at 179° C.

2-(6-Chloropyrid-2-yl)-3-hydroxy-isoindolin-1-one employed as starting material can be prepared by slowly adding a solution of potassium borohydride (1.15 g.) in water (12 cc.) and N sodium hydroxide solution (1.5 cc.) to a suspension of 6-chloro-2-phthalimido-pyridine (7.3 g.) in methanol (150 cc.) whilst stirring and maintaining the temperature at about 6° C. After 20 hours at a temperature of about 20° C., the insoluble product is filtered off and then washed with methanol (20 cc.). After drying 2-(6-chloropyrid-2-yl)-3-hydroxy-isoindolin-1-one (6.1 g.) melting at 164° C. is obtained.

6-Chloro-2-phthalimido-pyridine can be prepared by heating a mixture of phthalic anhydride (5.45 g.) and 2-amino-6-chloropyridine (4.7 g.) in acetic acid (50 cc.) under reflux for 2 hours 40 minutes. After cooling, the reaction mixture is poured onto ice (150 g.). The crystalline product which forms is filtered off and then washed with water (100 cc.). After drying, 6-chloro-2-phthalimido-pyridine (7.3 g.) melting at 177° C. is obtained.

2-Amino-6-chloropyridine can be obtained according to the method described by M. P. Cava, J. Org. Chem. 23, 1287 (1958).

EXAMPLE 8

A suspension of 2-(3-chloropyrid-2-yl)-3-hydroxy-isoindolin-1-one (8.3 g.) in anhydrous dimethylformamide (65 cc.) is added to a suspension of sodium hydride (50% dispersion in mineral oil) (1.7 g.) in anhydrous dimethylformamide (65 cc.), whilst maintaining the temperature at about 27° C. When the evolution of gas ceases, a solution of 1-chlorocarbonyl-4-methylpiperazine (5.65 g.) in anhydrous dimethylformamide (10 cc.) is added whilst maintaining the temperature at about 30° C. The reaction mixture is stirred for a further hour after the end of the addition and is then poured into ice-water (700 cc.). The oily product which separates out is extracted with chloroform (1000 cc.). The solution obtained is washed with water (200 cc.), dried over sodium sulphate and then concentrated to dryness under reduced pressure. An oily product (14.3 g.) is obtained which on crystallisation from a mixture of cyclohexane (100 cc.) and diisopropyl ether (200 cc.) yields 3-(4-methylpiperazin-1-yl) carbonyloxy-2-(3-chloropyrid-2-yl)isoindolin-1-one (9.1 g.) melting at about 100° C. (solvated with 8% of cyclohexane).

2-(3-Chloropyrid-2-yl)-3-hydroxy-isoindolin-1-one employed as starting material can be prepared by slowly adding a solution of potassium borohydride (2.97 g.) in water (30 cc.) and N sodium hydroxide solution (3.7 cc.) to a suspension of 3-chloro-2-phthalimido-pyridine (19.1 g.) in methanol (380 cc.), whilst stirring and maintaining the temperature at about 6° C. After 15 hours at a temperature of about 20° C., the insoluble product is filtered off and then washed with methanol (20 cc.). After drying, 2-(3-chloropyrid-2-yl) - 3 - hydroxy-isoindolin-1-one (8.3 g.), melting at 240° C., is obtained.

3-Chloro-2-phthalimido-pyridine can be prepared by heating a mixture of phthalic anhydride (32.2 g.) and 2-amino-3-chloropyridine (28 g.) in acetic acid (280 cc.) under reflux for 2 hours. After cooling, the reaction mixture is poured onto ice (1000 g.). The product which precipitates is extracted with chloroform (500 cc.). The solution obtained is washed with N sodium hydroxide solution (100 cc.) and then with water (200 cc.), dried over sodium sulphate and concentrated to dryness under reduced pressure (30 mm. Hg.). 3-Chloro-2-phthalimidopyridine (19.3 g.), melting at about 140° C., is thus obtained.

2-Amino-3-chloropyridine can be obtained according to the method described by H. J. den Hertog, Rec. Trav. Chim. 69, 673 (1950).

EXAMPLE 9

A suspension of 2-(4-chloropyrid-2-yl)-3-hydroxyisoindolin-1-one (7.15 g.) in anhydrous dimethylformamide (55 cc.) is added to a suspension of sodium hydride (50% dispersion in mineral oil) (1.47 g.) in anhydrous dimethylformamide (55 cc.), whilst maintaining the temperature at about 27° C. When the evolution of gas ceases, a solution of 1-chlorocarbonyl-4-methylpiperazine (4.9 g.) in anhydrous dimethylformamide (10 cc.) is added whilst maintaining the temperature at about 30° C. The reaction mixture is stirred for a further hour after the end of the addition and then poured into ice-water (600 cc.). The product which crystallises is filtered off and then washed with water (60 cc.). After drying, a product (10.3 g.) melting at 190–192° C. is obtained.

After two recrystallisations, the first from acetonitrile (200 cc.) and the second from acetone (450 cc.), 2-(4-chloropyrid-2-yl)-3-(4-methylpiperazin - 1 - yl)carbonyloxy-isoindolin-1-one (6.3 g.), melting at 193° C., is obtained.

2-(4-Chloropyrid-2-yl)-3-hydroxy - isoindolin - 1 - one employed as starting material can be prepared by slowly adding a solution of potassium borohydride (1.2 g.) in water (12 cc.) and N sodium hydroxide solution (1.5 cc.) to a suspension of 4-chloro-2-phthalimido-pyridine (8 g.) in methanol (160 cc.) whilst stirring and maintaining the temperature at about 7° C. After 20 hours at a temperature of about 20° C., the insoluble product is filtered off and then washed with methanol (20 cc.). After drying, 2-(4-chloropyrid-2-yl)-3-hydroxy-isoindolin-1 - one (7.15 g.), melting at 196–197° C., is obtained.

4-Chloro-2-phthalimido-pyridine can be prepared by heating a mixture of phthalic anhydride (3.7 g.) and 2-amino-4-chloropyridine (3.2 g.) in acetic acid (35 cc.) under reflux for 90 minutes. After cooling, the reaction mixture is poured onto ice (150 g.). The product which crystallises is filtered off and then washed with water (60 cc.). After drying, 4-chloro-2-phthalimido-pyridine (4.2 g.), melting at 157–158° C., is obtained.

2-Amino-4-chloropyridine can be obtained according to the method described by R. Graf, Ber., 64 B, 22 (1931).

EXAMPLE 10

1-Methylpiperazine (4.6 g.) is added to a suspension of 2-(5-chloropyrid-2-yl)-5-nitro-3 - phenoxy - carbonyloxyisoindolin-1-one (9.8 g.) in acetonitrile (60 cc.). Thereafter the suspension is left for 18 hours at a temperature of about 20° C., and the insoluble matter is then filtered off. A solid (12.8 g.) melting at 180–182° C. is thus obtained. Recrystallisation from acetonitrile (140 cc.) and drying yields 2-(5-chloropyrid-2-yl)-3-(4 - methylpiperazin-1-yl)carbonyloxy-5-nitroisoindolin-1-one (6.15 g.) melting at 187–188° C.

2-(5-Chloropyrid-2-yl)-5-nitro - 3 - phenoxycarbonyloxy-isoindolin-1-one employed as starting material can be prepared by adding phenyl chloroformate (7.5 g.) to a suspension of 2-(5-chloropyrid-2-yl)-3-hydroxy-5-nitroisoindolin-1-one (9.5 g.) in anhydrous pyridine (190 cc.), whilst keeping the temperature at about 5° C. Thereafter the reaction mixture is left for 16 hours at a temperature of about 20° C. and is then poured into ice-water (1350 cc.). The product which crystallises is filtered off and then washed with water (100 cc.). A product (13.7 g.) melting at 185° C. is thus obtained. Recrystallisation from acetonitrile (185 cc.) yields 2-(5-chloropyrid-2-yl)-5-nitro-3-phenoxycarbonyloxy-isoindolin-1-one (10.4 g.) melting at 194° C.

2-(5-Chloropyrid-2-yl)-3-hydroxy-5 - nitro - isoindolin-1-one can be prepared by adding potassium borohydride (4.6 g.) to a suspension of N-(5-chloropyrid-2-yl)-4-nitrophthalimide (33.5 g.) in dioxane (335 cc.) whilst maintaining the temperature at about 15° C. The reaction mixture is kept at 22° C. for 5 hours and is then cooled to 10° C. Water (116 cc.) is then added all at once; the product which crystallises is filtered off and then washed with a water-dioxane mixture (2–1 by volume; 30 cc.). Thereafter, water (580 cc.) is immediately added to the filtrate and the product which precipitates is filtered off and then washed with water (60 cc.). After drying 2-(5-chloropyrid-2-yl)-3-hydroxy-5-nitro - isoindolin - 1 - one (7 g.), melting at 244–246° C., is obtained.

N-(5-Chloropyrid-2-yl)-4-nitrophthalimide, melting at 180° C., can be prepared by heating a mixture of 4-nitrophthalic anhydride and 2-amino-5-chloropyridine in diphenyl ether under nitrogen at 190° C. for 25 minutes.

EXAMPLE 11

Following the procedure of Example 10, starting from 5-chloro-2-(5-chloropyrid-2-yl) - 3 - phenoxycarbonyloxy isoindolin-1-one (6.2 g.) and 1-methylpiperazine (5 g.), 5-chloro-2-(5-chloropyrid-2-yl)-3-(4-methylpiperazin - 1-yl)carbonyloxyisoindolin-1-one (4.35 g.), melting at 154° C., is obtained.

5-Chloro-2-(5-chloropyrid-2-yl) - 3 - phenoxycarbonyloxy-isoindolin-1-one, melting at 128° C., employed as starting material can be prepared by reaction of 5-chloro-2-(5-chloropyrid-2-yl)-3-hydroxy-isoindolin-1 - one with phenyl chloroformate at a temperature of about 5° C.

5-Chloro-2-(5-chloropyrid-2-yl)-3-hydroxy - isoindolin-1-one can be prepared by addition of potassium borohydride (5.8 g.) to a suspension of 4-chloro-N-(5-chloropyrid-2-yl)phthalimide (40.5 g.) in methanol (600 cc.), whilst maintaining the temperature at about 10° C. Thereafter the reaction mixture is left for 1 hour at 20° C. and the insoluble matter is then filtered off and washed with methanol (100 cc.). After drying, a product (32.6 g.) melting at 185–190° C. is obtained. This product is dissolved in boiling dimethylformamide (250 cc.). On cooling, a product crystallises, which is filtered off and then washed with dimethylformamide (20 cc.). The filtrate is evaporated to dryness under reduced pressure and the residue obtained is treated with acetone (700 cc.) at 25° C. An insoluble material is filtered off and an approximately 3N solution of hydrogen chloride in diethyl ether (50 cc.) followed by diethyl ether (100 cc.) is then added to the filtrate. A product crystallises slowly and is filtered off and then washed with acetone (20 cc.). After drying, a product (10.7 g.), melting at 180° C. with decomposition, is obtained. This product is treated with an aqueous saturated sodium bicarbonate solution (100 cc.) and with chloroform (200 cc.). The aqueous layer is decanted and then extracted with chloroform (2×100 cc.). The organic extracts are combined, washed with water (3×100 cc.), dried over sodium sulphate and then evaporated to dryness under reduced pressure. A product (8.4 g.), melting at 180° C., is thus obtained. After two recrystallisations, the first from 1,2-dichloroethane (85 cc.) and the second from chloroform (70 cc.), 5-chloro-2-(5-chloropyrid-2-yl)-3-hydroxy-isoindolin-1-one (4 g.), melting at 184–185° C., is obtained.

4-Chloro-N-(5-chloropyrid-2-yl)phthalimide can be prepared by heating a mixture of 4-chlorophthalic anhydride (50 g.) and 2-amino-5-chloropyridine (35.2 g.) in acetic acid (550 cc.) under reflux for 2 hours. The product which crystallises on cooling is filtered off and then washed with diethyl ether (200 cc.). After drying, 4-chloro-N-(5-chloropyrid-2-yl)phthalimide (40.5 g.), melting at 160° C., is obtained.

EXAMPLE 12

By following the procedure of Example 10 but starting with 3-phenoxycarbonyloxy-2-(pyrid-2-yl)isoindolin-1-one (17.3 g.) and 1-ethylpiperazine (11.4 g.), 3-(4-ethylpiperazin-1-yl)carbonyloxy-2-(pyrid-2-yl)isoindolin-1-one (10.5 g.), melting at 145° C., is obtained.

EXAMPLE 13

By following the procedure of Example 10 but starting with 3-phenoxycarbonyloxy-2-(pyrid-2-yl)isoindolin-1-one (10.4 g.) and 1-hydroxyethylpiperazine (7.8 g.), 3-(4-hydroxyethylpiperazin-1-yl)carbonyloxy-2-(pyrid - 2 - yl)isoindolin-1-one (12.7 g.), melting at 168° C., is obtained.

EXAMPLE 14

By following the procedure of Example 10 but starting with 3-phenoxycarbonyloxy-2-(pyrid-2-yl)isoindolin - 1 - one (17.3 g.) and 1-isopropylpiperazine (12.8 g.), 3-(4-isopropylpiperazin-1-yl)carbonyloxy-2-(pyrid-2 - yl)isoindolin-1-one (14 g.), melting at 118–120° C., is obtained.

EXAMPLE 15

By following the procedure of Example 10 but starting with 3-phenoxycarbonyloxy-2-(pyrid-2-yl)isoindolin-1-one (17.3 g.) and 1-allylpiperazine (12.5 g.), 3-(4-allylpiperazin-1-yl)carbonyloxy-2-(pyrid-2-yl)isoindolin-1-one (9.3 g.), melting at 113–114° C., is obtained.

EXAMPLE 16

By following the procedure of Example 10 but starting with 2-(5-nitropyrid-2-yl)-3-phenoxycarbonyloxy - isoindolin-1-one (29 g.) and 1-methylpiperazine (29.6 g.), 3-(4-methylpiperazin-1-yl)carbonyloxy-2-(5 - nitropyrid - 2-yl)isoindolin-1-one (13.5 g.), melting at 214° C., is obtained.

2-(5-Nitropyrid-2-yl)-3-phenoxycarbonyloxy-isoindolin-1-one, melting at 180–183° C., employed as starting material can be prepared by reaction of 3-hydroxy-2-(5-nitropyrid-2-yl)isoindolin-1-one with phenyl chloroformate at a temperature of about 5° C.

3-Hydroxy-2-(5-nitropyrid-2-yl)-isoindolin-1 - one can be prepared by addition of potassium borohydride (4.05 g.) to a suspension of 5-nitro-2-phthalimidopyridine (26.9 g.) in methanol (1000 cc.), whilst maintaining the temperature at about 20° C. The reaction mixture is maintained at about 20° C. for a further three hours after the end of the addition. The insoluble matter is filtered off and then washed with methanol (100 cc.). After drying, a product (23 g.) melting at 250–252° C. is obtained. After recrystallisation from acetic acid (900 cc.), 3-hydroxy-2-(5-nitropyrid-2-yl)isoindolin-1-one (20.2 g.) melting at 255° C. is obtained.

5-Nitro-2-phthalimido-pyridine, melting at 222° C., can be prepared by reaction of 2-amino-5-nitropyridine with phthalic anhydride in acetic acid under reflux.

2-Amino-5-nitropyridine can be prepared in accordance with the method described by W. T. Caldwell and E. C. Kornfeld, J. Amer. Chem. Soc., *64*, 1695 (1942).

EXAMPLE 17

By following the procedure of Example 10 but starting with 2-(5-cyanopyrid-2-yl)-3-phenoxycarbonyloxy - isoindolin-1-one (11.1 g.) and 1-methylpiperazine (6 g.), 2-(5-cyanopyrid-2-yl)-3-(4-methylpiperazin-1-yl)carbonyloxy-isoindolin-1-one (5.2 g.), melting at 206° C., is obtained.

2-(5-Cyanopyrid-2-yl)-3 - phenoxycarbonyloxy - isoindolin-1-one, melting at 154–155° C., employed as starting material can be prepared by reaction of 2-(5-cyanopyrid-2-yl)-3-hydroxy-isoindolin-1-one with phenyl chloroformate at a temperature of about 5° C.

2-(5-Cyanopyrid-2-yl)-3-hydroxy-isoindolin - 1 - one, melting at 223° C., can be prepared by reaction of potassium borohydride with 5-cyano-2-phthalimido-pyridine in methanol at a temperature of about 20° C.

5-Cyano-2-phthalimido-pyridine, melting at 195° C., can be prepared by reaction of 2-amino-5-cyanopyridine with phthalic anhydride in acetic acid under reflux.

2-Amino-5-cyanopyridine can be prepared according to the method described by P. Z. Gregory et al., J. Chem. Soc., 87 (1947).

EXAMPLE 18

By following the procedure of Example 10 but starting with 5,6-dichloro-3-phenoxycarbonyloxy-2-(pyrid-2-yl)-isoindolin-1-one (14.5 g.) and 1-methylpiperazine (7 g.), 5,6-dichloro-3-(4-methylpiperazin-1-yl)carbonyloxy-2-(pyrid-2-yl)isoindolin-1-one (8.8 g.), melting at 188° C., is obtained.

5,6-Dichloro - 3 - phenoxycarbonyloxy-2-(pyrid-2-yl)-isoindolin-1-one, melting at 204–205° C., employed as starting material can be prepared by reaction of 5,6-dichloro - 3 - hydroxy-2-(pyrid-2-yl)-isoindolin-1-one with phenyl chloroformate at a temperature of about 5° C.

5,6-Dichloro - 3 - hydroxy-2-(pyrid-2-yl)-isoindolin-1-one, melting at 250° C., can be prepared by reaction of potassium borohydride with 2-(4,5-dichlorophthalimido)-pyridine in an aqueous methanolic medium at a temperature between 20° and 30° C.

2-(4,5-Dichlorophthalamido)pyridine, melting at 230° C., can be prepared by reaction of 4,5-dichlorophthalic anhydride with 2-aminopyridine in diphenyl ether at a temperature of about 200° C.

4,5-Dichlorophthalic anhydride can be prepared according to the method described by E. E. Ayling, J. Chem. Soc., 253 (1929).

EXAMPLE 19

A solution of 2-(5-chloro - 6 - methylpyrid-2-yl)-3-hydroxy-isoindol-1-one (16.5 g.) in anhydrous dimethylformamide (85 cc.) is added to a suspension of sodium hydride (54% dispersion in mineral oil) (3.2 g.) in anhydrous dimethylformamide (30 cc.), whilst maintaining the temperature at about 25° C. When the evolution of gas has ceased, 1-chlorocarbonyl-4-methylpiperazine (10.7 g.) is added whilst maintaining the temperature at about 25° C. The reaction mixture is stirred for a further 2 hours after the end of the addition and is then poured into ice-water (810 cc.). The product which crystallises is filtered off and then washed with water (150 cc.) and diisopropyl ether (100 cc.) After drying, a product (23.7 g.) melting at 180° C. is obtained. Recrystallization from acetonitrile (440 cc.) yields 2-(5-chloro-6-methylpyrid-2-yl) - 3 - (4 - methylpiperazin-1-yl)-carbonyloxy-isoindolin-1-one (20.2 g.) melting at 180° C.

2-(5 - Chloro - 6 - methylpyrid-2-yl)-3-hydroxy-isoindolin-1-one, melting at 155–156° C., employed as starting material can be prepared by reaction of potassium borohydride with 5-chloro-6-methyl-2-phthalimido-pyridine in an aqueous methanolic medium at a temperature between 20° and 30° C.

5-Chloro-6-methyl-2-phthalimido-pyridine, melting at 158° C., can be prepared by reaction of phthalic anhydride with 2-amino-5-chloro-6-methylpyridine in diphenyl ether at a temperature of about 200° C.

2-Amino-5-chloro-6-methylpyridine can be prepared by addition of 55 vol. hydrogen peroxide (150 cc.) to a solution of 2-amino-6-methylpyridine (54 g.) in concentrated hydrochloric acid ($d=1.19$; 550 cc.) maintained at a temperature of about 80° C. The reaction mixture is maintained at a temperature of about 25° C. for one and a half hours and is then adjusted to pH 4 by adding sodium hydroxide solution ($d=1.33$; 490 cc.) whilst maintaining the temperature at 25° C. The product which precipitates is filtered off and then washed with water (100 cc.). The filtrate is rendered alkaline to pH 9 by adding sodium hydroxide solution ($d=1.33$; 33 cc.). The product which precipitates is then filtered off and thereafter washed with water (40 cc.). After drying, a product (44.8 g.) melting at 63° C. is obtained. Recrystallisation fro hexane (380 cc.) yields 2-amino-5-chloro-6-methylpyridine (25.5 g.) melting at 73° C.

EXAMPLE 20

By following the procedure of Example 19 but starting with 2-(5-chloro-4-methylpyrid-2-yl)-3-hydroxy-isoindolin-1-one (9.8 g.) and 1-chlorocarbonyl-4-methylpiperazine (6.4 g.), 2-(5-chloro - 4 - methylpyrid-2-yl)-3-(4-methylpiperazin-1-yl)carbonyloxy-isoindolin-1-one (11.4 g.), melting at 157–158° C., is obtained.

2-(5 - Chloro - 4 - methylpyrid-2-yl)-3-hydroxy-isoindolin-1-one, melting at 232–233° C., employed as starting material can be prepared by reaction of potassium borohydride with 5-chloro-4-methyl-2-phthalimido-pyridine, in an aqueous methanolic medium, at a temperature between 20° and 30° C.

5-Chloro-4-methyl-2-phthalimido-pyrimidine, melting at 152° C., can be prepared by reaction of phthalic anhydride with 2-amino-5-chloro-4-methylpyridine in diphenyl ether at a temperature of about 200° C.

2-Amino-5-chloro-4-methylpyridine can be prepared by addition of 55 vol. hydrogen peroxide (180 cc.) to a solution of 2-amino-4-methylpyridine (65 g.) in concentrated hydrochloric acid ($d=1.19$; 650 cc.) maintained at a temperature of about 80° C. The reaction mixture is thereafter maintained at a temperature of about 25° C. for 3 hours and then adjusted to pH 4 by addition of sodium hydroxide solution ($d=1.33$; 566 cc.), whilst maintaining the temperature at about 25° C. The product which precipitates is then filtered off and thereafter washed with water (210 cc.). The filtrate is rendered alkaline to pH 9 by adding sodium hydroxide solution ($d=1.33$; 34 cc.). The product which precipitates is then filtered off and thereafter washed with water (240 cc.). After drying, a product (45.6 g.) melting at 85–86° C. is obtained. This product is suspended in hexane (250 cc.), and the hexane suspension is then heated under reflux for 15 minutes. The insoluble product is filtered off hot and then washed with boiling hexane (50 cc.). After drying, 2-amino-5-chloro-4-methylpyridine (8.8 g.), melting at 152–153° C., is obtained.

EXAMPLE 21

By following the procedure of Example 19 but starting with 3 - hydroxy-2-(5-methylpyrid-2-yl)-isoindolin-1-one (11.8 g.) and 1-chlorocarbonyl - 4 - methylpiperazine (8.8 g.), 3-(4-methylpiperazin - 1 - yl)carbonyloxy-2-(5-methylpyrid-2-yl)-isoindolin-1-one (12.6 g.), melting at 180° C., is obtained.

3-Hydroxy-2-(5-methylpyrid - 2 - yl)-isoindolin-1-one, melting at 189–190° C., employed as starting material can be prepared by reaction of potassium borohydride with 5-methyl-2-phthalimido-pyridine in an aqueous methanolic medium at a temperature between 20° and 30° C.

5-Methyl-2-phthalimido-pyridine, melting at 180° C., can be prepared by reaction of phthalic anhydride with 2-amino-5-methylpyridine in diphenyl ether at a temperature of about 200° C.

EXAMPLE 22

By following the procedure of Example 19 but starting with 3-hydroxy - 2 - (5-methoxypyrid-2-yl)-isoindolin-1-one (6.7 g.) and 1-chlorocarbonyl-4-methylpiperazine (4.5 g.), 2-(5-methoxypyrid-2-yl)-3-(4-methylpiperazin-1-yl)carbonyloxy-isoindolin-1-one (8.3 g.), melting at 156° C., is obtained.

3 - Hydroxy-2-(5 - methoxypyrid-2-yl)-isoindolin-1-one, melting at 166° C., employed as starting material can be prepared by reaction of potassium borohydride with 5-methoxy-2-phthalimido-pyridine in methanol at a temperature of about 20° C.

5-Methoxy-2-phthalimido-pyridine can be prepared by addition of a solution of methyl sulphate (6.95 g.) in acetone (70 cc.) to a suspension of 5-hydroxy-2-phthalimido-pyridine (12 g.) and anhydrous potassium carbonate (13.8 g.) in acetone (240 cc.) maintained under reflux. Heating under reflux is continued for 80 minutes after the end of the addition. After cooling, the reaction mixture is filtered and the solution obtained is concentrated to dryness under reduced pressure. The pasty residue obtained is stirred with ethyl acetate (500 cc.) at 50° C. After separation of an oily insoluble material, the ethyl acetate is washed by decantation with water (225 cc.) and then dried over potassium carbonate in the presence of decolourising charcoal. The solution obtained after filtration is concentrated to a volume of 100 cc. The product which crystallises on cooling is filtered off and then washed with diisopropyl ether (45 cc.). After drying, 5-methoxy-2-phthalimido-pyridine (6.1 g.), melting at 144° C., is obtained.

5-Hydroxy-2-phthalimido-pyridine can be prepared by heating a solution of 2-amino-5-hydroxypyridine (6.4 g.) and phthalic anhydride (8.8 g.) in acetic acid (90 cc.) under reflux for 80 minutes. The boiling solution is thereafter treated with decolourising charcoal (1.5 g.) and then filtered hot. The product which crystallises on cooling is filtered off and then washed with acetic acid (10 cc.) and diethyl ether (45 cc.). After drying, 5-hydroxy-2-phthalimido-pyridine (6.45 g.) melting at 285° C. is obtained.

2-Amino-5-hydroxypyridine can be prepared in accordance with the method described by J. A. Moore and F. J. Marascia, J. Am. Chem. Soc. 81, 6053 (1959).

EXAMPLE 23

By following the procedure of Example 19 but starting from 3-hydroxy-2-(6-methoxypyrid-2-yl)-isoindolin-1-one (12.3 g.) and 1-chlorocarbonyl-4-methylpiperazine (8.4 g.), 2 - (6-methoxypyrid-2-yl)-3-(4-methylpiperazin-1-yl)carbonyloxy-isoindolin-1-one (10 g.), melting at 125° C., is obtained.

3 - Hydroxy-2-(6 - methoxypyrid-2-yl)-isoindolin-1-one, melting at 148° C., employed as starting material can be prepared by reaction of potassium borohydride with 6-methoxy-2-phthalimido-pyridine in an aqueous methanolic medium at a temperature between 20° and 30° C.

6-Methoxy-2-phthalimido-pyridine, melting at 158° C., can be prepared by reaction of phthalic anhydride with 2-amino-6-methoxypyridine in acetic acid under reflux.

2-Amino-6-methoxy pyridine can be prepared according to the method described by J. P. Wibaut et al., Rec. trav. chim. (Pays-Bas), 65, 65 (1946).

EXAMPLE 24

By following the procedure of Example 19, but starting with 2-(5-bromopyrid-2-yl) - 3 - hydroxy-isoindolin-1-one (15.2 g.) and 1-chlorocarbonyl-4-methylpiperazine (8.9 g.), 2-(5-bromopyrid-2-yl) - 3 - (4-methylpiperazin-1-yl)-carbonyloxy-isoindolin-1-one (12 g.), melting at 153° C., is obtained.

2-(5-Bromopyrid-2-yl) - 3 - hydroxy - isoindolin-1-one, melting at 198° C., employed as starting material can be prepared by reaction of potassium borohydride with 5-bromo-2-phthalimido-pyridine in an aqueous methanolic medium at a temperature between 20° and 30° C.

5-Bromo-2-phthalimido-pyridine, melting at 160° C., can be prepared by reaction of phthalic anhydride with 2-amino-5-bromopyridine in acetic acid under reflux.

2-Amino-5-bromopyridine can be prepared according to the method described in Org. Synth. 44, 34 (1964).

EXAMPLE 25

By following the procedure of Example 19 but starting with 3-hydroxy - 2 - (6-methylpyrid-2-yl)-isoindolin-1-one (14 g.) and 1-chlorocarbonyl-4-methylpiperazine (10.5 g.), 3 - (4-methylpiperazin-1-yl)carbonyloxy-2-(6-methyl-pyrid-2-yl)-isoindolin-1-one (14.2 g.), melting at 124° C., is obtained.

3-Hydroxy-2-(6-methylpyrid - 2 - yl)-isoindolin-1-one, melting at 126–127° C., can be prepared by reaction of potassium borohydride with 6-methyl-2-phthalimido- pyridine in an aqueous methanolic medium at a temperature between 20° and 30° C.

6-Methyl-2-phthalimido-pyridine, melting at 192° C., can be prepared by reaction of phthalic anhydride with 2-amino-6-methylpyridine in diphenyl ether at a temperature of about 200° C.

EXAMPLE 26

By following the procedudre of Example 19 but starting with 2-(5-chloropyrid-2-yl)-3-hydroxy-5-methylisoindolin-1-one (15 g.) and 1-chlorocarbonyl-4-methylpiperazine (10.3 g.), 2-(5-chloropyrid-2-yl)-5-methyl-3-(4-methyl-piperazin-1-yl)carbonyloxy-isoindolin - 1 - one (11.5 g.), melting at 149° C., is obtained.

2 - (5-Chloropyrid-2-yl)-3-hydroxy-5-methylisoindolin-1-one employed as starting material can be prepared by addition of potassium borohydride (10.5 g.) to a solution of N-(5-chloropyrid-2-yl)-4-methylphthalimide (10.5 g.) in dioxane (105 cc.). After 3 hours at 25° C., water (105 cc.) is added, and stirring is then continued for a further hour and a half. Thereafter, water (105 cc.) is added and the mixture is then stirred for one hour; the insoluble product is filtered off and then washed with water (50 cc.). After drying, 2 - (5-chloropyrid-2-yl)-3-hydroxy-5-methyl-isoindolin-1-one (8.8 g.) melting at 196° C. is obtained.

N-(5 - Chloropyrid-2-yl)-4-methylphthalimide, melting at 152° C., can be prepared by reaction of 4-methylphthalic anhydride with 2-amino-5-chloropyridine in diphenyl ether at a temperature of about 200° C.

4-Methylphthalic anhydride can be prepared according to the method described by W. Findeklee, Chem. Ber. 38, 3542 (1905).

EXAMPLE 27

A solution of 3-hydroxy-2-(3-methyl-5-chloropyrid-2-yl)-isoindolin-1-one (13.7 g.) in anhydrous dimethylformamide (100 cc.) is added to a suspension of sodium hydride (50% dispersion in mineral oil) (2.64 g.) in anhydrous dimethylformamide (20 cc.), whilst maintaining the temperature at about 20° C. When the evolution of gas has ceased, a solution of 1-chlorocarbonyl-4-methylpiperazine (9 g.) in anhydrous dimethylformamide (20 cc.) is added. After the end of the addition, the reaction mixture is stirred for a further 3 hours at a temperature of about 20° C. and is then poured into ice-water (1000 cc.). The gum which precipitates is extracted with diethyl ether (500 cc.). The organic layer is decanted, washed with water (100 cc.), dried over sodium sulphate and then concentrated to dryness. The residue obtained is dissolved in a methylene chloride-ethyl acetate mixture (3–1 by volume; 200 cc.) and the solution obtained is filtered through silica gel (180 g.) contained in a column 4 cm. in diameter. The column is thereafter successively eluted with a methylene chloride-ethyl acetate mixture (3–1 by volume; 400 cc.) and a methylene chloride-ethyl acetate mixture (1-1 by volume; 800 cc.). All these eluates are discarded. Thereafter the column is eluated with pure ethyl acetate (2800 cc.) and then with an ethyl acetate-methanol mixture (3-1 by volume; 200 cc.); these eluates are combined and concentrated to dryness under reduced pressure. An oily product (16.8 g.) which crystallises slowly is thus obtained. After two recrystallisations, the first from a cyclohexane-benzene mixture (3-1 by volume; 44 cc.) and the second from a cyclohexane-diethyl ether mixture (1-1 by volume; 260 cc.), 2-(3-methyl-5-chloropyrid-2-yl)-3-(4 - methylpiperazin-1-yl)-carbonyloxy-iso-indolin-1-one (10.7 g.), solvated with 10.4% of cyclohexane and melting at 105–106° C., is obtained.

2-(5 - Chloro-3-methylpyrid-2-yl)-3-hydroxyisoindolin-1-one, melting at 185–186° C., employed as starting material can be prepared by reaction of potassium borohydride with 5-chloro-3-methyl-2-phthalimidopyridine in an aqueous-methanolic medium at a temperature between 20° and 30° C.

5-Chloro-3-methyl-2-phthalimido-pyridine, melting at 145° C., can be prepared by reaction of phthalic anhydride with 2-amino-5-chloro-3-methylpyridine in diphenyl ether at a temperature of about 200° C.

2-Amino-5-chloro-3-methylpyridine can be prepared by addition of 55 vol. hydrogen peroxide (134 cc.) to a solution of 2-amino-3-methylpyridine (64.8 g.) in concentrated hydrochloric acid ($d=1.19$; 650 c.) maintained at a temperature of about 80° C. The reaction mixture is thereafter maintained at a temperature of 25° C. for 2 hours and is then adjusted to pH 8 by addition of sodium hydroxide solution ($d=1.33$; 615 cc.). The product which precipitates is filtered off and then washed with water (300 cc.). After drying, a product (70.5 g.) melting at 67° C. is obtained. After recrystallisation from a diisopropyl ether-hexane mixture (2-1 by volume), 2-amino-5-chloro-3-methylpyridine (59.6 g.) melting at 68° C. is obtained.

EXAMPLE 28

By following the procedure of Example 10 but starting wth 2-(3,5-dichloropyrid-2-yl) - 3 - phenoxycarbonyloxy-isoindolin-1-one (10 g.) and 1-methylpiperazine (4.8 g.), 2-(3,5-dichloropyrid-2-yl) - 3 - (4-methylpiperazin-1-yl) carbonyloxy-isoindolin-1-one (5.1 g.), solvated by 8.9% of cyclohexane and melting at 96–97° C. After recrystallisation from a cyclohexane-diethyl ether mixture (3-2 by volume), is obtained.

2-(3,5-Dichloropyrid-2-yl) - 3 - phenoxycarbonyloxyiso-indolin-1-one, melting at 134° C., employed as starting material can be prepared by reaction of 2-(3,5-dichloropyrid-2-yl)-3-hydroxy-isoindolin-1-one with phenyl chloroformate at a temperature of about 5° C.

2 - (3,5 - Dichloropyrid-2-yl)-3-hydroxy-isoindolin-1-one, melting at 180° C., can be prepared by reaction of potassium borohydride with 3,5-dichloro-2-phthalimido-pyridine in an aqueous methanolic medium at a temperature between 20° and 30° C.

3,5 - Dichloro-2-phthalimido-pyridine, melting at 160–162° C., can be prepared by reaction of phthalic anhydride with 2-amino-3,5-dichloropyridine in acetic acid under reflux.

2-Amino-3,5-dichloropyridine can be prepared according to the method described by Tschitschibabin and Jegorow, Z. Russ. Fiziko-chimiceskogo Obscestva, *60*, 685; Chem. Zbl., 1670 II (1928).

EXAMPLE 29

A mixture of 2-(1-oxo-3-phenoxycarbonyloxy-isoindolin-2-yl)-pyridine oxide (13.5 g.) and 1-methylpiperazine (7.5 g.) in acetonitrile (500 cc.) is stirred at a temperature of about 20° C. for 24 hours. The reaction mixture is concentrated to dryness under reduced pressure. An oily residue is thus obtained, which is dissolved in chloroform (250 cc.). The solution obtained is filtered through silica gel (200 g.) contained in a column 5 cm. in diameter. The column is successively eluted with chloroform (600 cc.), a chloroform-ethyl acetate mixture (1-1 by volume; 300 cc.) and pure ethyl acetate (1500 cc.). All these eluates are discarded. Thereafter the column is eluted with an ethyl acetate-methanol mixture (1-1 by volume; 1500 cc.). The solution obtained is concentrated to dryness under reduced pressure. A pale yellow oil (11.1 g.) which crystallises slowly is thus obtained. Recrystallisation from a methanol-diisopropyl ether mixture (1-4 by volume) yields 2-[3-(4-methylpiperazin-1-yl)carbonyloxy-1-oxo-isoindolin-2-yl]-pyridine oxide (5.7 g.) melting at 168° C.

2 - (1 - Oxo - 3 - phenoxycarbonyloxy - isoindolin - 2-yl)-pyridine oxide employed as starting material can be prepared by addition of phenyl chloroformate (9.7 g.) to a suspension of 2-(3-hydroxy-1-oxo-isoindolin-2-yl)-pyridine oxide (14.3 g.) in anhydrous pyridine (150 cc.), whilst maintaining the temperature at about 4° C. The reaction mixture is maintained at about 20° C. for 18 hours and then poured into ice-water (1000 cc.). The product which crystallises is filtered off and then washed with water (60 cc.). After drying, 2-(1-oxo-3-phenoxycarbonyl-oxy-isoindolin-2-yl)-pyridine oxide (9.2 g.) melting at 142° C. is obtained.

2-(3-Hydroxy-1-oxo-isoindolin-2-yl)-pyridine oxide can be obtained by addition of 110 vol. hydrogen peroxide (113 cc.) to a solution of 3-hydroxy-2-(pyrid-2-yl)-isoindolin-1-one (113 g.) in acetic acid (250 cc.) maintained at 75° C. The reaction mixture is maintained at 75° C. for 18 hours and then poured into a mixture of chloroform (2000 cc.), saturated aqueous sodium chloride solution (100 cc.) and potassium carbonate (500 g.). The insoluble inorganic salts are filtered off and then washed with chloroform (200 cc.). The chloroform solution obtained is washed with a saturated aqueous sodium chloride solution (100 cc.), dried over potassium carbonate in the presence of decolourising charcoal, filtered and then evaporated to dryness under reduced pressure. The residue obtained is treated with water (400 cc.) at 60° C. and the insoluble product is filtered off and then washed with water (50 cc.). The cooled filtrate is saturated with sodium chloride (300 g.) and then extracted with chloroform (450 cc.). The chloroform solution obtained is dried over sodium sulphate and then concentrated to a volume of 100 cc. On cooling in an ice bath, a product which crystallises is filtered off and then washed with acetonitrile (50 cc.). After drying, a first crop of 2-(3-hydroxy-1-oxo-isoindolin-2-yl)-pyridine oxide (7.7 g.), melting at 203° C., is obtained. The mother liquors are evaporated to dryness under reduced pressure and the residue is treated with acetonitrile (50 cc.) at 50° C. After cooling in an ice bath, the insoluble product is filtered off and then washed with acetonitrile (20 cc.). After drying, a second crop of 2-(3-hydroxy-1-oxo-isoindolin-2-yl)-pyridine oxide (6.6 g.), melting at 203° C., is obtained.

EXAMPLE 30

A solution of 3-hydroxy-2-(pyrid-2-yl)-isoindolin-1-one (9.8 g.) in anhydrous dimethylformamide (50 cc.) is added to a suspension of sodium hydride (50% dispersion in mineral oil) (2.29 g.) in anhydrous dimethylformamide (25 cc.), whilst maintaining the temperature at about 20° C. When the evolution of gas has ceased, a solution of 1-chlorothiocarbonyl-4-methylpiperazine (8.7 g.) in anhydrous dimethylformamide (10 cc.) is added. The reaction mixture is stirred for a further two and a half hours after the end of the addition and is then poured into water (600 cc.). The product which crystallises is filtered off and then washed with water (200 cc.). After drying, a product (15.6 g.) melting at 177° C. is obtained. Recrystallisation from acetonitrile (240 cc.) and washing with diisopropyl ether (80 cc.) yields 3-(4-methyl-piperazin - 1 - yl)thiocarbonyloxy - 2 - (pyrid - 2 - yl)-isoindolin-1-one (12.15 g.) melting at 182–183° C.

1-Chlorothiocarbonyl-4-methylpiperazine can be prepared according to the method described by B. B. Angier *et al.*, J. Med. Chem. *11*, 720 (1968).

The present invention includes within its scope pharmaceutical compositions comprising, as active ingredient, at least one of the isoindoline derivatives of general formula I, or a non-toxic acid addition salt thereof, in association with a pharmaceutical carrier or coating. The invention includes especially such preparations made up for oral, parenteral or rectal administration or local application, e.g. as ointments.

Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 50 mg. and 500 mg. of active substance per day. In general the physician will decide the posology considered appropriate, taking into account the age and weight and other factors intrinsic to the patient being treated.

The following Example illustrates pharmaceutical compositions according to the invention.

EXAMPLE 31

Tablets containing 25 mg. of active product and having the following composition are prepared in accordance with the usual technique:

| | G. |
|---|---|
| 3-(4-methylpiperazin-1-yl)carbonyloxy-2-(pyrid-2-yl)-isoindolin-1-one | 0.025 |
| Starch | 0.090 |
| Precipitated silica | 0.030 |
| Magnesium stearate | 0.005 |

EXAMPLE 32

Tablets containing 25 mg. of active product and having the following composition are prepared in accordance with the usual technique:

| | G. |
|---|---|
| 2-(5-chloropyrid-2-yl) - 3 - (4-methylpiperazin-1-yl)carbonyloxy-isoindolin-1-one | 0.025 |
| Starch | 0.090 |
| Precipitated silica | 0.030 |
| Magnesium stearate | 0.005 |

We claim:

1. An isoindoline derivative of the formula:

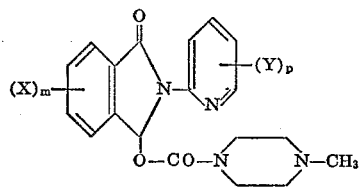

wherein X and Y are each chlorine, bromine, methyl o nitro, and $m$ and $p$ are each 0 or 1, and non-toxic pharmaceutically acceptable acid addition salts thereof.

2. The isoindoline derivative according to claim 1 which is 2-(5-chloropyrid-2-yl) - 3 - (4-methylpiperazin-1-yl)carbonyloxy-isoindolin-1-one, and non-toxic pharmaceutically acceptable acid addition salts thereof.

3. The isoindoline derivative according to claim 1 which is 3-(4 - methylpiperazin-1-yl)carbonyloxy-2-(5-methyl-pyrid-2-yl)-isoindolin-1-one, and non-toxic pharmaceutically acceptable acid addition salts thereof.

4. The isoindoline derivative according to claim 1 which is 2-(5 - bromopyrid-2-yl)-3-(4-methylpiperazin-1-yl)carbonyloxy-isoindolin-1-one, and non-toxic pharmaceutically acceptable acid addition salts thereof.

5. The isoindoline derivative according to claim 1 which is 5-chloro - 2 - (5-chloropyrid-2-yl)-3-(4-methyl-piperazin-1-yl)carbonyloxy - isoindolin-1-one, and non-toxic pharmaceutically acceptable acid addition salts thereof.

6. The isoindoline derivative according to claim 1 which is 2 - (5 - chloropyrid-2-yl)-3-(4-methylpiperazin-1-yl)carbonyloxy-5-nitro-isoindolin-1-one, and non-toxic pharmaceutically acceptable acid addition salts thereof.

References Cited
UNITED STATES PATENTS

| | | | |
|---|---|---|---|
| 3,100,776 | 8/1963 | Poos | 260—268 BC |
| 3,159,634 | 12/1964 | Jack | 260—268 BC |
| 3,198,798 | 8/1965 | Zenitz | 260—268 BC |
| 3,436,402 | 4/1969 | Cassady | 260—268 C |
| 3,466,297 | 9/1969 | Sulkowski | 260—326.1 |
| 3,635,976 | 1/1972 | Shetty | 260—268 C |

DONALD G. DAUS, Primary Examiner

U.S. Cl. X.R.

260—256, 268 C, 295 M, 296 R, 346.7; 424—230, 250

UNITED STATES PATENT OFFICE
CERTIFICATE OF CORRECTION

Patent No. 3,847,921          Dated November 12, 1974

Inventor(s) CLAUDE COTREL et al

It is certified that error appears in the above-identified patent and that said Letters Patent are hereby corrected as shown below:

In column 1, in the heading, the name of the third inventor should be --Jeanmart--, and not "Jenmart".

Signed and Sealed this nineteenth Day of August 1975

[SEAL]

Attest:

RUTH C. MASON
*Attesting Officer*

C. MARSHALL DANN
*Commissioner of Patents and Trademarks*